(12) United States Patent
Yamasaki et al.

(10) Patent No.: US 9,013,766 B2
(45) Date of Patent: Apr. 21, 2015

(54) IMAGE READING APPARATUS CAPABLE OF PROVIDING IMPROVED LAYOUT OF WIRING CABLE

(71) Applicants: Yasuo Yamasaki, Nagoya (JP); Hiroyuki Shingai, Nagoya (JP)

(72) Inventors: Yasuo Yamasaki, Nagoya (JP); Hiroyuki Shingai, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/161,852

(22) Filed: Jan. 23, 2014

(65) Prior Publication Data
US 2014/0211280 A1 Jul. 31, 2014

(30) Foreign Application Priority Data

Jan. 31, 2013 (JP) ................................. 2013-016503

(51) Int. Cl.
*H04N 1/04* (2006.01)
*H04N 1/00* (2006.01)

(52) U.S. Cl.
CPC ................................. *H04N 1/00522* (2013.01)

(58) Field of Classification Search
USPC ................. 358/497, 498, 474, 496
See application file for complete search history.

(56) References Cited

U.S. PATENT DOCUMENTS

| 6,002,508 | A | * | 12/1999 | Mai | 359/212.1 |
| 6,975,436 | B2 | * | 12/2005 | Saito | 358/497 |
| 8,593,702 | B2 | * | 11/2013 | Nagasaka | 358/474 |
| 2012/0026558 | A1 | | 2/2012 | Fujiwara | |

FOREIGN PATENT DOCUMENTS

| JP | 2000-253216 A | 9/2000 |
| JP | 2012-034106 A | 2/2012 |

* cited by examiner

*Primary Examiner* — Houshang Safaipour
(74) *Attorney, Agent, or Firm* — Banner & Witcoff, Ltd.

(57) ABSTRACT

An image reading apparatus includes: a base section; a reading unit; a movable body; a drive unit; and a cable. The movable body supports the reading unit and reciprocates between first and second end positions in a first direction. The drive unit is disposed on a first side where the first end position is located. The cable has one end portion fixed to a base wall of the base section and another end portion connected to the reading unit. The cable includes: a first elongated portion extending from the one end portion; a curved portion extending from the first elongated portion toward a second side where the second end position is located and then curving toward the first side; and a second elongated portion connected to the another end portion. The curved portion has a part overlapping with the drive unit in the first direction.

9 Claims, 6 Drawing Sheets

IMAGE READING APPARATUS CAPABLE OF PROVIDING IMPROVED LAYOUT OF WIRING CABLE

CROSS REFERENCE TO RELATED APPLICATION

This application claims priority from Japanese Patent Application No. 2013-016503 filed Jan. 31, 2013. The entire content of the priority application is incorporated herein by reference.

TECHNICAL FIELD

The present invention relates to an image reading apparatus.

BACKGROUND

There is conventionally known an image reading apparatus including a base section, and, within the base section, further including a reading unit, a movable body, a drive unit, and a wiring cable. The base section has a bottom wall, and a reading surface disposed opposite to the bottom wall. The reading unit is configured to read images from originals placed on the reading surface. The movable body supports the reading unit. The movable body is reciprocatingly movable in a first direction, parallel to the reading surface, between a base end position and a terminal end position. The drive unit is disposed at a position closer to the base end position than to the terminal end position, and adapted to drive the movable body. The wiring cable has one end portion fixed to the bottom wall at a position intermediate between the base end position and the terminal end position, and another end portion connected to the reading unit. The wiring cable has flexibility.

The wiring cable has a first elongated portion, a curved portion, and a second elongated portion. The first elongated portion extends from the one end portion of the wiring cable along the bottom wall toward the base end position. The curved portion extends from the first elongated portion and curves so as to approach the reading unit while changing its direction toward the terminal end position. The second elongated portion extends from the curved portion and extends toward the terminal end position to reach the other end portion of the wiring cable. In other words, the curved portion protrudes toward the drive unit in the first direction.

With this image reading apparatus, as the movable body moves in the first direction, the reading unit reads an image from an original placed on the reading surface while moving along with the movable body. At this time, the curved portion of the wiring cable moves in the first direction along with the movable body. In accordance with this movement, one of the first elongated portion and the second elongated portion becomes longer, while the other of the first elongated portion and the second elongated portion becomes shorter. Hence, the wiring cable follows the movement of the movable body without impeding the image reading operation performed by the reading unit.

SUMMARY

In the meantime, for the purpose of reducing the size of the conventional image reading apparatus described above, modification of the layout is conceivable such that the drive unit and at least the curved portion of the wiring cable overlap with each other when viewed in the first direction.

However, in this case, with the conventional image reading apparatus, because the curved portion protrudes toward the drive unit in the first direction, the curved portion may come into contact with the drive unit while the movable body reciprocatingly moves. This contact between the curved portion and the drive unit may in turn cause noises, and may also cause malfunctions of the drive unit when driving the movable body.

In view of the foregoing, it is an object of the present invention to provide an image reading apparatus capable of preventing noises caused by a curved portion of a wiring cable coming into contact with a drive unit and malfunctions of the drive unit in driving a movable body while making the apparatus more compact.

In order to attain the above and other objects, the present invention provides an image reading apparatus including: a base section; a reading unit; a movable body; a drive unit; and a cable. The base section includes a reading surface on which an original to be read is placeable and a base wall confronting the reading surface. The reading surface extends in a first direction. The reading unit is disposed above the base wall, and configured to read an image from an original placed on the reading surface. The movable body is disposed above the base wall, and configured to support the reading unit. The movable body is configured to reciprocatingly move in the first direction between a first end position and a second end position. The drive unit is disposed on the base wall and disposed on a first side where the first end position is located with respect to the first direction. The drive unit is configured to drive the movable body. The cable has flexibility and disposed above the base wall. The cable has one end portion and another end portion. The one end portion is fixed to the base wall at a position between the first end position and the second end position. The another end portion is connected to the reading unit. The cable including: a first elongated portion; a curved portion; and a second elongated portion. The first elongated portion extends along the base wall from the one end portion toward a second side where the second end position is located with respect to the first direction. The curved portion extends from the first elongated portion toward the second side and then curving toward the first side while approaching the reading surface. The curved portion has a part overlapping with the drive unit in the first direction. The second elongated portion extends from the curved portion toward the first side to be connected to the another end portion.

According to another aspect, the present invention provides an image reading apparatus including: a reading portion; a base section; a reading unit; a movable body; a drive unit; and a cable. The reading portion includes a reading surface on which an original to be read is placeable. The base section includes a base wall confronts the reading surface. The reading unit is disposed in the base section and configured to read an image from an original placed on the reading surface. The movable body is disposed in the base section and configured to support the reading unit. The movable body is configured to reciprocatingly move between a first stroke end and a second stroke end in a direction parallel to the reading surface. The drive unit is disposed in the base section on a first stroke end side and configured to drive the movable body. The cable has flexibility and disposed in the base section. The cable has one end portion and another end portion. The one end portion is fixed to the base wall at a position intermediate between the first stroke end and the second stroke end. The another end portion is connected to the reading unit. The cable includes a curved portion provided between the one end portion and the another end portion. The curved portion protrudes toward a second stroke end side. The curved portion has a part overlapping with the drive unit in the direction parallel to the reading surface.

DETAILED DESCRIPTION

An image reading apparatus according to one embodiment of the present invention will be described with reference to FIGS. 1 through 8B.

Throughout the specification, the terms "upward", "downward", "upper", "lower", "above", "below", "beneath", "right", "left", "front", "rear" and the like will be used assuming that the image reading apparatus 1 is disposed in an orientation in which it is intended to be used. More specifically, in FIG. 1, a side of the image reading apparatus 1 where an operation panel 5 is provided will be referred to as a front side of the image reading apparatus 1, and hence, left, right, top, and bottom sides of the image reading apparatus 1 will be based on the perspective of a user facing the operation panel 5 of the image reading apparatus 1. Directions related to the image reading apparatus 1 in FIGS. 2 through 8B will be given based on the directions related to the image reading apparatus 1 in FIG. 1.

<General Structure of Image Reading Apparatus>

Figure 1:
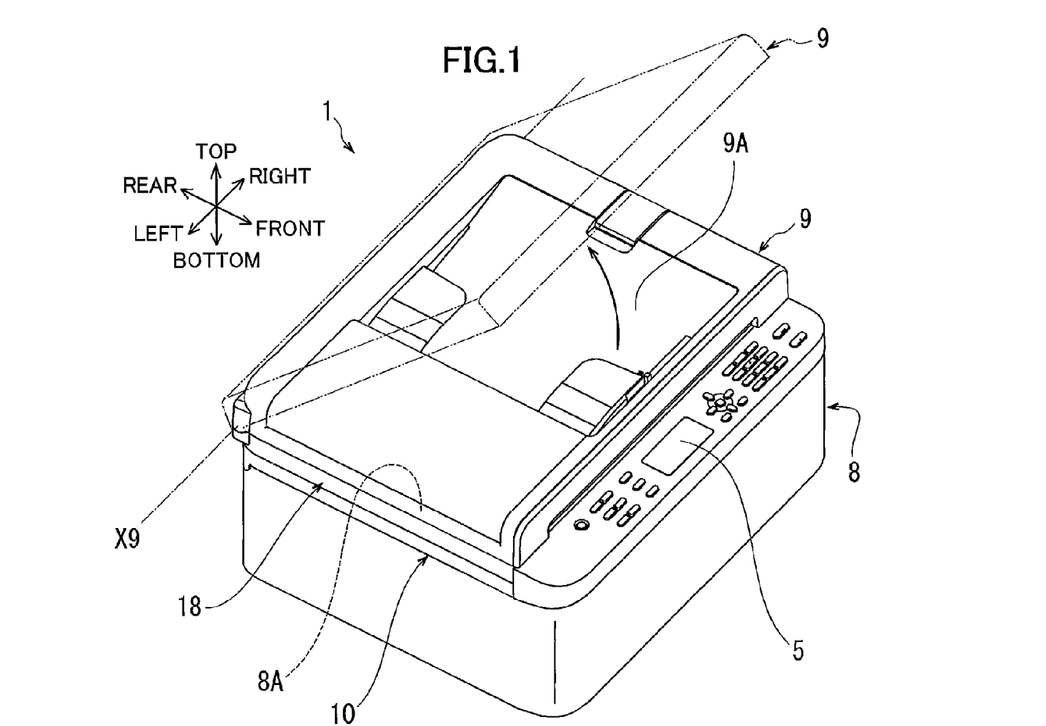
FIG. 1 is a perspective view of an image reading apparatus according to one embodiment of the present invention.
Figure 2:
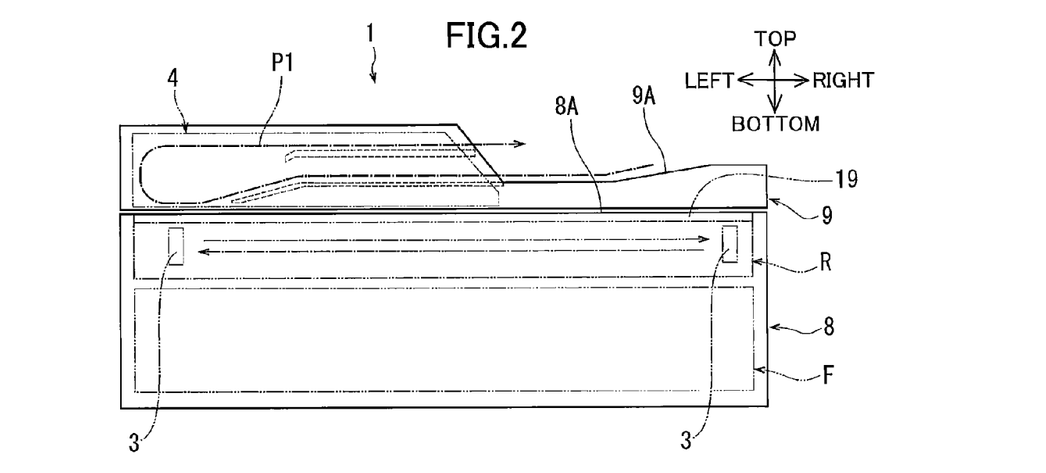
FIG. 2 is a schematic side view of the image reading apparatus according to the embodiment.

As shown in FIGS. 1 and 2, the image reading apparatus 1 includes a main section 8 and a cover section 9. The main section 8 has a substantially flat box-like shape. As shown in FIG. 1, the main section 8 has a front portion at which the operation panel 5 is provided. As shown in FIG. 2, the main section 8 has an upper portion on which a platen glass 19 is disposed. An upper surface of this platen glass 19 serves as a reading surface 8A shown in FIG. 2. When an original is to be read while held in a stationary position, the original is placed onto the reading surface 8A. The original is typically sheets of paper, books, and the like.

The main section 8 has an upper rear edge on which hinges (not shown) are disposed. The cover section 9 is supported to the main section 8 via the hinges. The cover section 9 is pivotally movable relative to the main section 8 about an axis X9 extending in a left-right direction, as shown in FIG. 1. That is, the cover section 9 is movable between a closed position in which the cover section 9 covers the reading surface 8A from above, as shown by solid lines in FIG. 1, and an open position that the cover section 9 exposes an upper side of the reading surface 8A. When the cover section 9 is moved from the closed position to the open position, the cover section 9 pivots about the axis X9 such that a front portion of the cover section 9 is moved above and rearward. In this way, a user can place the original onto the reading surface 8A.

As shown in FIGS. 1 and 2, the cover section 9 has an upper portion at which a document tray 9A is provided. In addition, an automatic document feeding mechanism 4 is disposed within the cover section 9, as shown in FIG. 2. The automatic document feeding mechanism 4, which is generally known and thus not described in detail, serves to separate a plurality of sheets placed on the document tray 9A into individual sheets, and to feed the sheets sequentially along a conveyance path P1.

The main section 8 has a lower portion in which an image forming unit F is provided. The image forming unit F accommodates an ink jet or laser type of image forming unit (not shown). The main section 8 has an upper portion in which an image reading unit R is provided. The image reading unit R is configured of a base section 10, the platen glass 19, and a frame 18, as shown in FIGS. 1 through 6.

The base section 10 is made from a thermoplastic resin. The base section 10 is an injection-molded product. The base section 10 has a bottom wall 11 and side walls 12, as shown in FIGS. 3 through 6.

The bottom wall 11 includes a first portion 11A, a second portion 11B, and a third portion 11C. The bottom wall 11 further includes a left end portion 11L and a right end portion 11R.

The first portion 11A is disposed at a front portion of the base section 10 (bottom wall 11), and extends substantially horizontally. The second portion 11B is disposed at a rear portion of the base section 10 (bottom wall 11) and extends substantially horizontally. The second portion 11B has an upper surface positioned lower than an upper surface of the first portion 11A. The third portion 11C is disposed at a rear left end portion of the base section 10 (bottom wall 11), and extends substantially horizontally. The third portion 11C has an upper surface positioned lower than both the upper surface of the first portion 11A and the upper surface of the second portion 11B.

Incidentally, in the present embodiment, the term "extends substantially horizontally" may be taken to include concave or convex portions on the surfaces and walls, as well as some amount of tilting, bending, or curving.

The side walls 12 include a front wall 12A, a rear wall 12B, a left wall 12L, and a right wall 12R. The front wall 12A protrudes upward from a front end portion of the bottom wall 11. The rear wall 12B protrudes upward from a rear end portion of the bottom wall 11. The left wall 12L protrudes upward from the left end portion 11L. The right wall 12R protrudes upward from the right end portion 11R.

The front wall 12A, the rear wall 12B, the left wall 12L, and the right wall 12R enclose the periphery of the bottom wall 11, the interior sides thereof defining an accommodating region 10A. Within the accommodating region 10A, a carriage 20, a reading unit 3, a wiring cable 50, and a scanning mechanism 30 are accommodated.

Figure 5A:
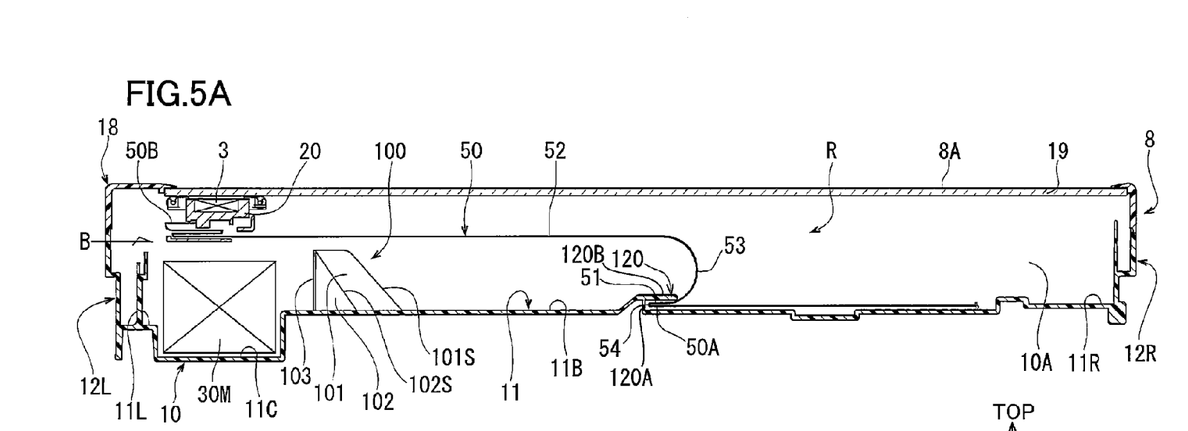
FIG. 5A is a cross-sectional view of the image reading apparatus according to the embodiment taken along a line A-A in FIG. 3.
Figure 5B:
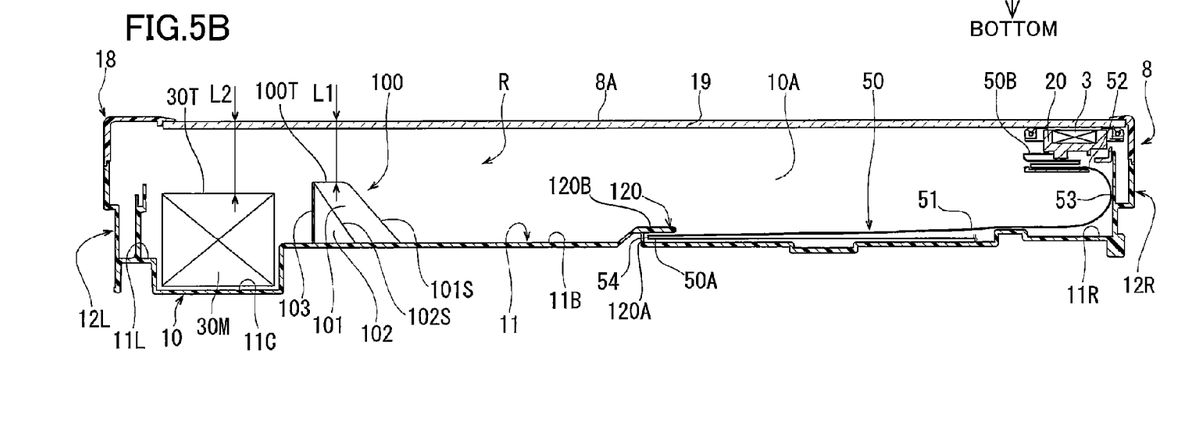
FIG. 5B is a cross-sectional view of the image reading apparatus according to the embodiment taken along the line A-A in FIG. 3
Figure 6:
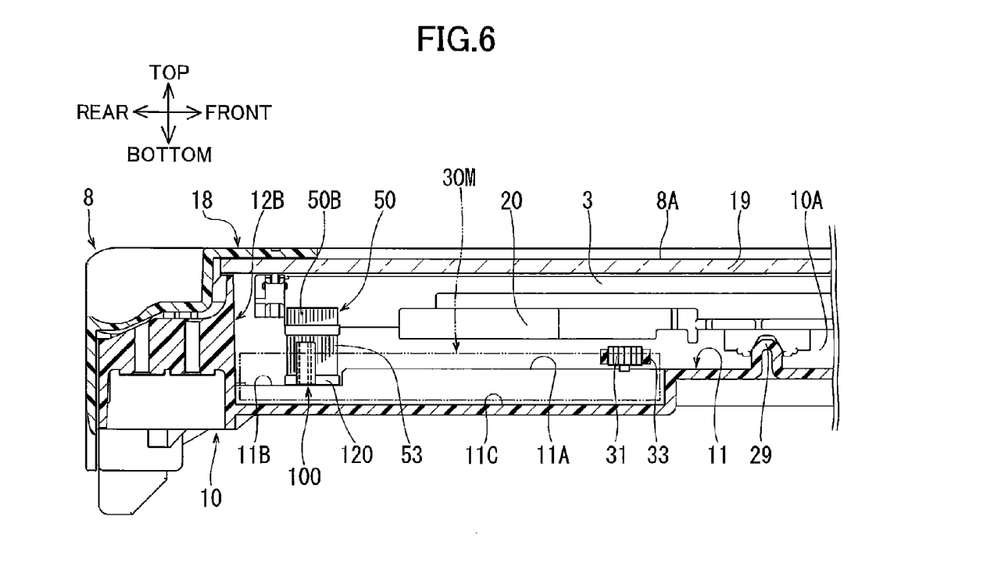
FIG. 6 is a partial side cross-sectional view of an image forming apparatus according to the embodiment as viewed from a direction indicated by an arrow B in FIG. 5A.

A periphery of the platen glass 19 is supported from below by the front wall 12A, the rear wall 12B, the left wall 12L, and the right wall 12R. The periphery of the platen glass 19 is also contacted from above by the frame 18. As the platen glass 19 is assembled to the base section 10 in this way, the platen glass 19 is fixed to the main section 8. As shown in FIGS. 5 and 6, the platen glass 19 whose upper surface serves as the reading surface 8A opposes the bottom wall 11 vertically with spacing therebetween, and covers the accommodating region 10A.

Figure 3:
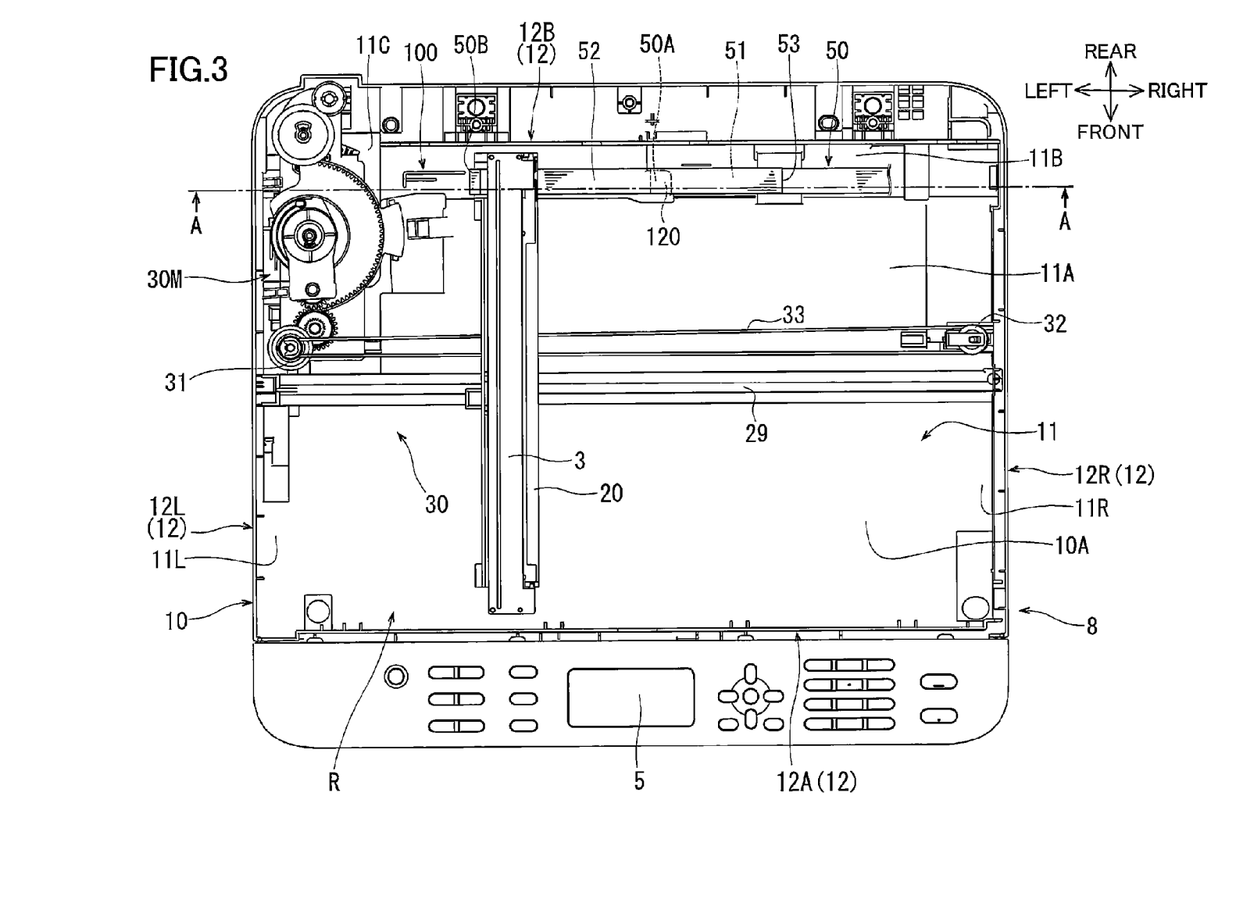
FIG. 3 is a top plan view showing an image reading unit of the image reading apparatus according to the embodiment, in which a platen glass has been removed from the reading unit.
Figure 4:
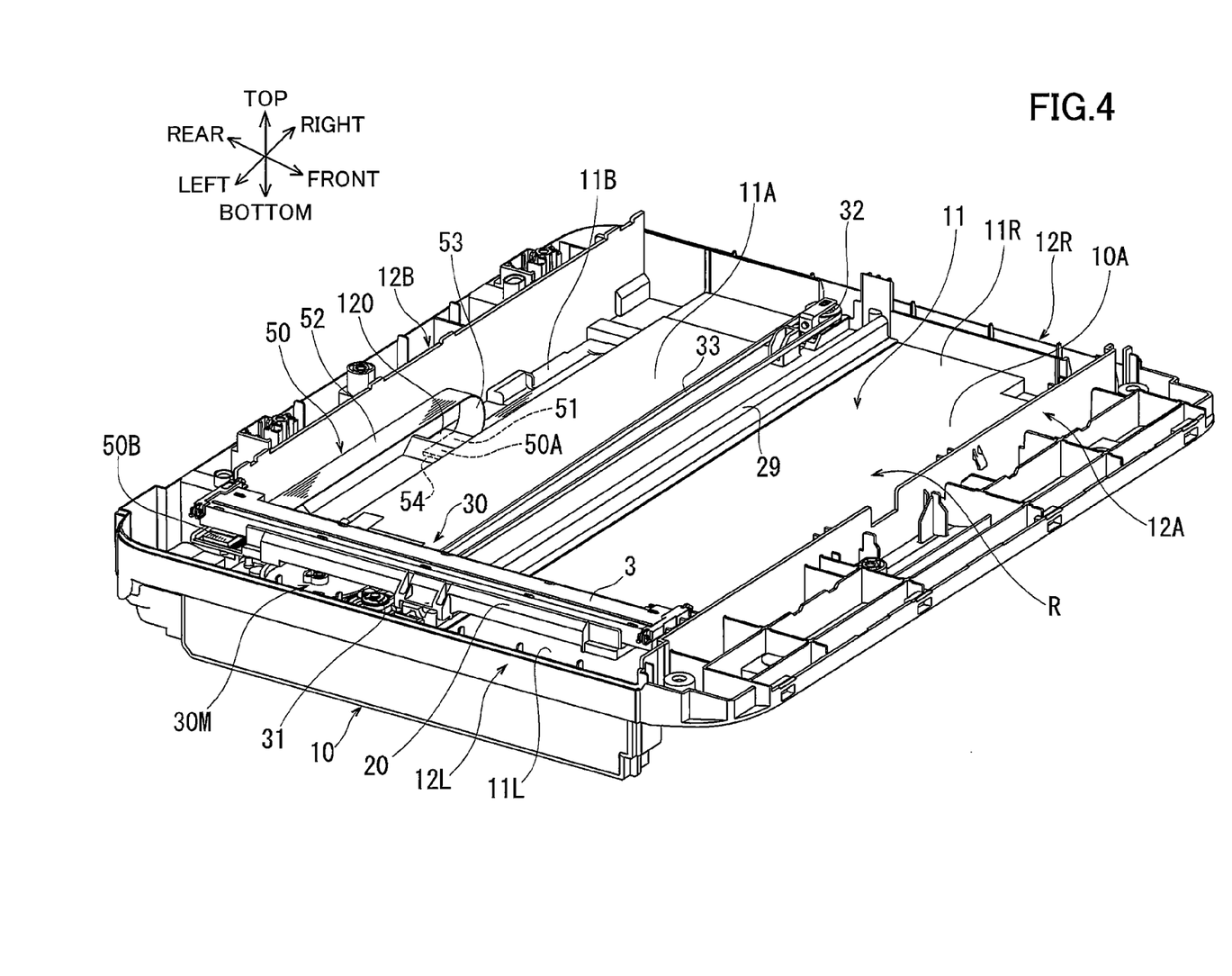
FIG. 4 is a perspective view showing a base section, a reading unit, a carriage, a drive unit, and a wiring cable of the image reading apparatus according to the embodiment.

As shown in FIGS. 3, 4, and 6, a guide rail 29 is provided on the upper surface of the first portion 11A. The guide rail 29 is disposed in the approximate front-rear center region of the first portion 11A. The guide rail 29 protrudes upward and extends in a left-right direction. The guide rail 29 has a left end extending to a lower portion of the left wall 12L, and a right end extending to a lower portion of the right wall 12R. The guide rail 29 has an upper edge extending in the left-right direction and in parallel with the reading surface 8A.

As shown in FIGS. 3 through 6, the carriage 20 is elongated in a front-rear direction, extending to the vicinity of the front wall 12A and the rear wall 12B. The carriage 20 is made from resin. The carriage 20 is guided by the guide rail 29, and is thereby reciprocatingly movable along the guide rail 29 in the left-right direction between a base end position positioned above the left end portion 11L and a terminal end position positioned above the right end portion 11R, as shown in FIGS. 5A and 5B.

As shown in FIGS. 3 through 6, the reading unit 3 is mounted onto the carriage 20. The reading unit 3 is supported by the carriage 20 within the accommodating region 10A so as to oppose the platen glass 19 from below. The reading unit 3 is a generally known image reading sensor such as a CIS (contact image sensor) or CCD (charge coupled device). The reading unit 3 has a length to such an extent that exceeds a front-rear width of the original (of the maximum readable size for the image reading apparatus 1) to be placed on the reading surface 8A. The reading unit 3 reciprocatingly moves along with the carriage 20 between the base end position to the terminal end position, as shown in FIGS. 5A and 5B.

The scanning mechanism 30 includes a drive unit 30M, a drive pulley 31, a follow pulley 32, and a timing belt 33, as shown in FIGS. 3 through 6.

The drive unit 30M is provided with an electric motor, and a plurality of gears meshingly engagable with the electric motor. The drive unit 30M is disposed on the left end portion 11L, and is also disposed on the third portion 11C. That is, the drive unit 30M is disposed on a side where the base end position is located with respect to the left-right direction. The drive unit 30M adjoins the left wall 12L and extends from the vicinity of the left end of the guide rail 29 to the rear wall 12B. The drive unit 30M rotates under control of a control unit (not shown).

As shown in FIGS. 3, 4, and 6, the drive pulley 31 is integrally formed with a frontmost gear (not shown) of the gears constituting the drive unit 30M. The drive pulley 31 adjoins the left wall 12L and is disposed rearward of the left end of the guide rail 29. The drive pulley 31 has an axis aligned vertically and is rotatable about the axis.

When the drive unit 30M rotates under the control of the control unit (not shown), the drive pulley 31 is driven to rotate. In response to the control unit switching the direction of rotation of the electric motor, the drive pulley 31 rotates forward or backward.

As shown in FIGS. 3 and 4, the follow pulley 32 adjoins the right wall 12R and is disposed rearward of the right end of the guide rail 29. The follow pulley 32 has an axis aligned vertically and is rotatable about the axis.

The timing belt 33 is an endless belt looped around the drive pulley 31 and the follow pulley 32 in a taut state. The timing belt 33 has a pair of straight portions extending in parallel from the drive pulley 31 to the follow pulley 32. While not shown in FIG. 3 or 4, one of the straight portions is connected to the carriage 20. Circular movement of the timing belt 33, following the forward and backward rotation of the drive pulley 31, is thereby transmitted to the carriage 20. The carriage 20 thus becomes reciprocatingly movable in the left-right direction.

As shown in FIGS. 3 through 6, the wiring cable 50 is a flexible flat cable joining a plurality of insulated wires into a belt-like shape. The wiring cable 50 has a portion installed above the second portion 11B.

The portion of the wiring cable 50 installed above the second portion 11B has one end portion 50A and another end portion 50B. More specifically, the one end portion 50A is fixed, using double-sided adhesive tape or the like, to the second portion 11B at a position intermediate between the left end portion 11L and the right end portion 11R. The wiring cable 50 extends from the one end portion 50A along the second portion 11B toward the right end portion 11R side (i.e., rightward), and a distal end of the wiring cable 50 is electrically connected to a control unit (not shown) provided in the main section 8. The other end portion 50B is fixed to the carriage 20, and a distal end of the other end portion 50B is electrically connected to the reading unit 3 via a connector (not shown).

Note that, in the present embodiment, the one end portion 50A is not exactly located at either end portion of the wiring cable 50. However, the term "one end portion 50" is used herein, taking particular note of a portion of the wiring cable 50 between the one end portion 50A and the other end portion 50B, that is, a portion of the wiring cable 50 movable in association with the reciprocating movement of the carriage 20.

More specifically, the wiring cable 50 includes a first elongated portion 51, a curved portion 53, and a second elongated portion 52.

As shown in FIGS. 5A and 5B, the first elongated portion 51 extends slightly from the one end portion 50A toward the left end portion 11L side (i.e., leftward), and then curves about 180 degrees, changing its extending direction from a leftward direction toward a rightward direction. The first elongated portion 51 then follows the second portion 11B and extends toward the right end portion 11R side (i.e., rightward). A portion of the first elongated portion 51 that curves about 180 degrees near the one end portion 50A constitutes a folded portion 54.

As shown in FIGS. 4, 5A, and 5B, a positioning portion 120 is provided at an intermediate portion of the second portion 11B between the left end portion 11L and the right end portion 11R. More specifically, the bottom wall 11 has a protruding portion 120A protruding slightly upward from the second portion 11B, and a planar portion 120B extending toward the right end portion 11R side (i.e., rightward) from the top of the protruding portion 120A. That is, the positioning portion 120 is a groove defined by the second portion 11B, the protruding portion 120A, and the planar portion 120B. The positioning portion 120 serves to stop the folded portion 54 from the left end portion 11L side. More specifically, the protruding portion 120A restricts the folded portion 54 from moving toward the left end portion 11L side (i.e., leftward). Further, the positioning portion 120 accommodates the folded portion 54 such that the folded portion 54 is vertically interposed between the planar portion 120B and the second portion 11B. As a result, the positioning portion 120 can fix the position of the one end portion 50A of the wiring cable 50 relative to the bottom wall 11 of the base section 10 with respect to the left-right direction.

The curved portion 53 extends from the first elongated portion 51, and curves in a semicircular shape to approach the reading surface 8A, changing its extending direction from a rightward direction toward a leftward direction. In other words, the curved portion 53 protrudes toward the right end portion 11R side, that is, an opposite side of the drive unit 30M with respect to the left-right direction.

The second elongated portion 52 extends from the curved portion 53, and extends along the platen glass 19 toward the left end portion 11L side (i.e., leftward). The second elongated portion 52 passes downward of the carriage 20, and then extends upward to be connected to the other end portion 50B while folding over multiple times.

Using the wiring cable 50 with the above-described configuration, the reading unit 3 mounted on the carriage 20 is electrically connected with the control unit (not shown).

When the carriage 20 moves from the base end position (i.e., left end portion 11L side) to the terminal end position (i.e., right end portion 11R side), that is, when the carriage 20 moves from a position shown in FIG. 5A to a position shown in FIG. 5B, the second elongated portion 52 is pushed by the carriage 20, thereby moving the curved portion 53 rightward. As the carriage 20 moves from the position shown in FIG. 5A to the position shown in FIG. 5B, the first elongated portion 51 becomes longer, and the second elongated portion 52 becomes shorter.

On the other hand, when the carriage 20 moves from the terminal end position (i.e., right end portion 11R side) to the base end position (i.e., left end portion 11L side), that is, when the carriage 20 moves from the position shown in FIG. 5B to the position shown in FIG. 5A, the second elongated portion 52 is pulled by the carriage 20, thereby moving the curved portion 53 leftward. As the carriage 20 moves from the position shown in FIG. 5B to the position shown in FIG. 5A, the first elongated portion 51 becomes shorter, and the second elongated portion 52 becomes longer.

That is, the length of the first elongated portion 51 can vary depending on the position of the carriage 20. Also, the length of the second elongated portion 52 can vary depending on the position of the carriage 20. Further, the position of the curved portion 53 in the wiring cable 50 can vary depending on the position of the carriage 20.

In this way, the wiring cable 50 follows the movement of the carriage 20 without impeding the image reading operation performed by the reading unit 3.

FIG. 6 shows, by a two-dot chain line, an outer profile of the drive unit 30M as viewed in a direction indicated by an arrow B shown in FIG. 5A. Incidentally, an upper edge of the outer profile of the drive unit 30M is represented by 30T in FIG. 6. As shown in FIG. 6, when viewed in the left-right direction, a part of the drive unit 30M overlaps with at least a part of the curved portion 53 of the wiring cable 50.

As shown in FIGS. 3, and 5A through 7, a guide part 100 is provided on the second portion 11B. As shown in FIGS. 5A and 5B, the guide part 100 is disposed between the one end portion 50A of the wiring cable 50 and the drive unit 30M in the left-right direction. The guide part 100 is positioned closer to the drive unit 30M than to the one end portion 50A. As shown in FIG. 6, when viewed in the left-right direction, the guide part 100 overlaps with at least a part of the curved portion 53 of the wiring cable 50, and also overlaps with a part of the drive unit 30M.

Figure 7:
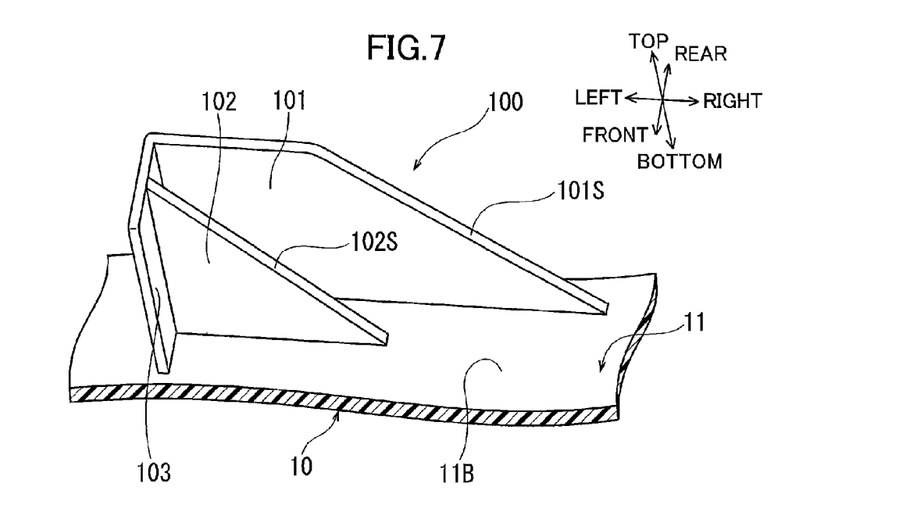
FIG. 7 is a partial perspective view showing a guide part of an image reading apparatus according to the embodiment.

As shown in FIG. 7, the guide part 100 has a first plate-shaped portion 101 and a second plate-shaped portion 102, and a connecting portion 103. The first and second plate-shaped portions 101 and 102 and the connecting portion 103 protrude upward from the second portion 11B toward the reading surface 8A.

The first plate-shaped portion 101 and the second plate-shaped portion 102 are juxtaposed with and spaced away from each other in the front-rear direction, with each extending in the left-right direction. The connecting portion 103 extends in the front-rear direction, and bridges between a left edge of the plate-shaped portion 101 and a left edge of the plate-shaped portion 102.

The first plate-shaped portion 101 has a first inclined surface 101S on its right side. The second plate-shaped portion 102 has a second inclined surface 102S on its right side. The first inclined surface 101S and the second inclined surface 102S linearly slope upward and leftward, respectively. More specifically, the first inclined surface 101S and the second inclined surface 102S are surfaces sloping upward from the right end portion 11R side to the left end portion 11L side. The first inclined surface 101S is positioned rightward of the second inclined surface 102S. The first plate-shaped portion 101 has an upper edge extending horizontally from an upper edge of the first inclined surface 101S and connecting with an upper edge of the connecting portion 103. An upper edge of the second inclined surface 102S connects directly to the upper edge of the connecting portion 103.

In other words, the guide part 100 has an upper edge 100T constituted by the upper edge of the first plate-shaped portion 101, the upper edge of the second plate-shaped portion 102 and the upper edge of the connecting portion 103.

As shown in FIG. 5B, the reading surface 8A and the upper edge 100T of the guide part 100 defines a first distance L1 therebetween. Further, as shown in FIG. 5B, the reading surface 8A and the upper edge 30T of the drive unit 30M defines a second distance L2 therebetween. The first distance L1 is smaller than the second distance L2.

<Image Reading Operation>

With this image reading apparatus 1, when reading an image from an original placed on the reading surface 8A, the drive unit 30M of the scanning mechanism 30 operates to move the reading unit 3 mounted on the carriage 20 from the left end side (base end position) to the right end side (terminal end position) within the main section 8, as shown in FIG. 2. The reading unit 3 thereby reads the image from the original placed on the reading surface 8A. After the reading unit 3 has finished reading the image from the original, the scanning mechanism 30 moves the reading unit 3 from the right end side to the left end side within the main section 8. Hence, the reading unit 3 is returned to its original position. That is, when reading an image from an original placed on the reading surface 8A, the reading unit 3 is set to be positioned at the base end position, and moved from the base end position to the terminal end position for reading the image from the original, and then, returned to the base end position after the image has been read.

Moreover, with this image reading apparatus 1, when reading images from a plurality of sheets of the original placed on the document tray 9A, the drive unit 30M of the scanning mechanism 30 operates to move the reading unit 3 mounted on the carriage 20 to a fixed reading position, as shown in FIGS. 2 and 4. The fixed reading position is a position on the left end side within the main section 8. The automatic document feeding mechanism 4 then sequentially conveys the sheets of the original placed on the document tray 9A one by one along the conveyance path P1. While each sheet of the original passes over the reading unit 3 positioned at the fixed reading position (i.e., base end position), the reading unit 3 reads the images from the passing sheet.

In this way, the image reading apparatus 1 can read the images from the originals placed on the reading surface 8A and the document tray 9A.

<Operational Effects>

With the image reading apparatus 1 according to the above-described embodiment, as shown in FIG. 6, a part of the drive unit 30M overlaps with at least a part of the curved portion 53 of the wiring cable 50 as viewed in the left-right direction.

This configuration enhances the degree of freedom in laying out the drive unit 30M and the wiring cable 50. Thus, downsizing of the image reading apparatus 1 can be achieved compared to a case where the drive unit 30M and the wiring cable 50 are laid out such that the drive unit 30M does not overlap with the wiring cable 50 as viewed in the left-right direction.

Further, with the image reading apparatus 1 according to the above-described embodiment, as shown in FIGS. 3 through 5B, the one end portion 50A of the wiring cable 50 is fixed to the second portion 11B of the bottom wall 11 at a position intermediate between the left end portion 11L and the right end portion 11R of the bottom wall 11. The first elongated portion 51 of the wiring cable 50 extends from the one end portion 50A along the bottom wall 11 toward the side where the right end portion 11R is located. The curved portion 53 of the wiring cable 50 extends from the first elongated portion 51, and curves to approach the reading surface 8A while changing its extending direction from the side where the right end portion 11R is located toward the side where the left end portion 11L is located. The second elongated portion 52 of the wiring cable 50 extends from the curved portion 53 toward the side where the left end portion 11L is located, and is connected to the other end portion 50B. The other end portion 50B is connected to the reading unit 3.

In other words, the curved portion 53 of the wiring cable 50 protrudes toward the opposite side of the drive unit 30M with respect to the left-right direction, and is thus kept at a distance from the drive unit 30M.

Hence, with the image reading apparatus 1 according to the above-described embodiment, the curved portion 53 of the wiring cable 50 is unlikely to come into contact with the drive unit 30M even if the position of the curved portion 53 is changed in accordance with the movement of the carriage 20.

As a result, the image reading apparatus 1 according to the above-described embodiment can be reduced in size, while preventing noises caused by the curved portion 53 of the wiring cable 50 coming into contact with the drive unit 30M, and malfunctions of the drive unit 30M in driving the carriage 20.

Further, with the image reading apparatus 1 according to the above-described embodiment, as shown in FIGS. 5A and 5B, the degree of freedom in moving the wiring cable 50 along with the carriage 20 can be increased by the folded portion 54 formed on the first elongated portion 51 near the one end portion 50A.

Further, with the image reading apparatus 1 according to the above-described embodiment, as shown in FIG. 5, the one end portion 50A of the wiring cable 50 is fixed into position by the positioning part 120. The positioning portion 120 is provided at the intermediate portion of the second portion 11B of the bottom wall 11. Hence, dislocation of the one end portion 50A is unlikely to occur, and installation of the wiring cable 50 is readily performed.

Moreover, the groove constituted by the positioning part 120 restricts the folded portion 54 from moving toward the side where the left end portion 11L is located, and also accommodates the folded portion 54 such that the folded portion 54 is covered vertically from a side where the bottom wall 11 is located as well as from a side where the reading surface 8A is located. Thus, the one end portion 50A of the wiring cable 50 can be positioned accurately relative to the base section 10.

Further, with the image reading apparatus 1 according to the above-described embodiment, as shown in FIGS. 5 and 7, the guide part 100 protrudes toward the reading surface 8A from the second portion 11B at a position between the one end portion 50A and the drive unit 30M. The guide part 100 includes the first plate-shaped portion 101 and the second plate-shaped portion 102. The first plate-shaped portion 101 has the first inclined surface 101S that slopes upward toward the side where the left end portion 11L is located. The second plate-shaped portion 102 has the second inclined surface 102S that slopes upward toward the side where the left end portion 11L is located.

Figure 8A:
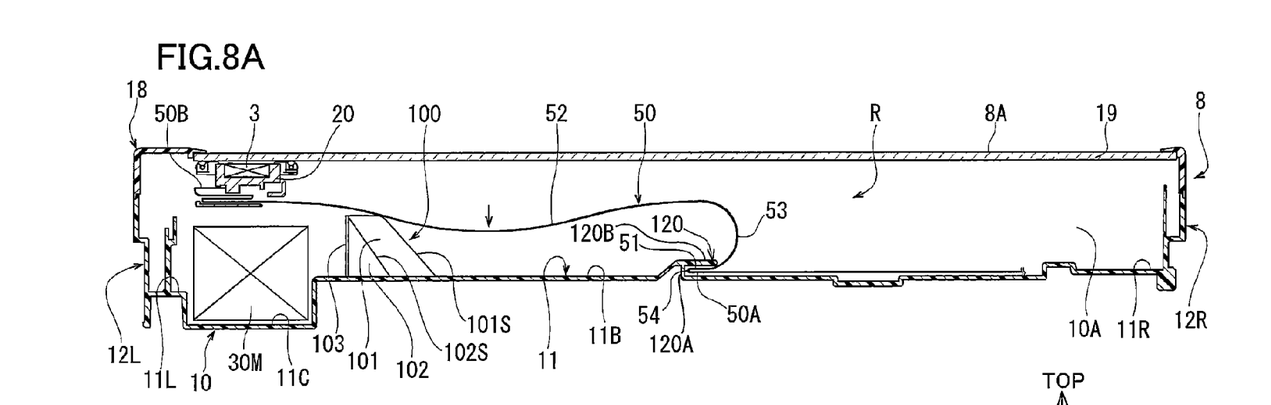
FIG. 8A is a cross-sectional view of the image reading apparatus according to the embodiment taken along the line A-A in FIG. 3.

With this configuration, in the image reading apparatus 1, as shown in FIG. 8A, when the carriage 20 moves to the side where the left end portion 11L is located, the second elongated portion 52 of the wiring cable 50 becomes longer and may sag down. However, even if it is the case, the second elongated portion 52 comes into contact with the first inclined surface 101S and the second inclined surface 102S prior to coming into contact with the drive unit 30M.

Thus, with the image reading apparatus 1 according to the above-described embodiment, the guide part 100 can guide the second elongated portion 52 such that the second elongated portion 52 is lifted upward from the bottom wall 11 toward the reading surface 8A. Accordingly, even if the second elongated portion 52 sags down, the guide part 100 can prevent the second elongated portion 52 from coming into contact with the drive unit 30M. As a result, the image reading apparatus 1 according to the above-described embodiment can further prevent noises caused by the second elongated portion 52 as well as the curved portion 53 of the wiring cable 50 coming into contact with the drive unit 30M, and malfunctions of the drive unit 30M in driving the carriage 20.

Figure 8B:
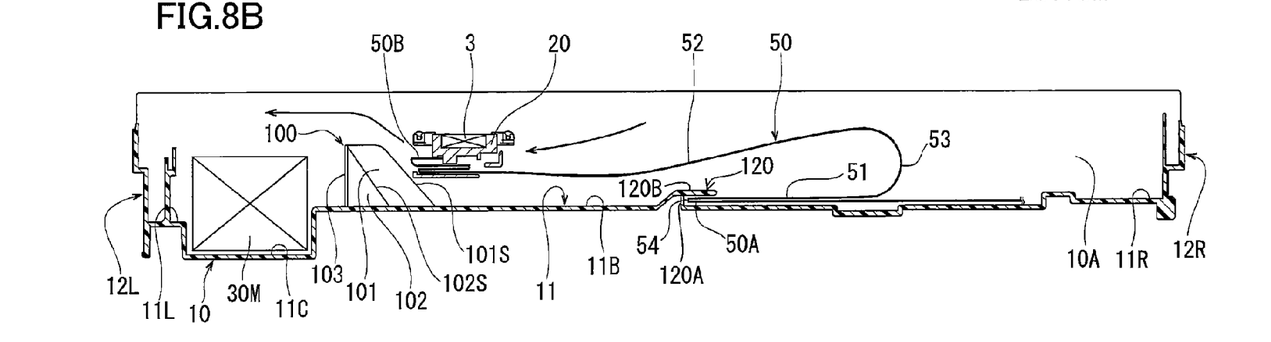
FIG. 8B is a cross-sectional view of the image reading apparatus according to the embodiment taken along the line A-A in FIG. 3.

Further, with the image reading apparatus 1 according to the above-described embodiment, as shown in FIG. 8B, during a manufacturing process of the image reading apparatus 1, there may be a possibility that the carriage 20 may tilt and come too close to the second portion 11B when the carriage 20 is assembled to the base section 10 to which the platen glass 19 and the frame 18 have not yet assembled. In such a case, even if the carriage 20 is moved toward the side where the left end portion 11L is located, the carriage 20 comes into contact with the first inclined surface 101S and the second inclined surface 102S prior to coming into contact with the drive unit 30M. Thus, the carriage 20 can be guided by the guide part 100 such that the carriage 20 is lifted upward from the bottom wall 11 toward the reading surface 8A. Hence, the carriage 20 coming too close to the second portion 11B is restrained by the guide part 100 from coming into contact with the drive unit 30M. As a result, with the image reading apparatus 1 according to the above-described embodiment, damages to the drive unit 30M during the assembly of the base section 10 can be prevented.

Further, with the image reading apparatus 1 according to the above-described embodiment, rigidity can be imparted to the guide part 100 by providing the guide part 100 with the first plate-shaped portion 101, the second plate-shaped portion 102, and the connecting portion 103.

Further, with the image reading apparatus 1 according to the above-described embodiment, as shown in FIG. 5B, the first distance L1 defined between the reading surface 8A and the upper edge 100T of the guide part 100 is smaller than the second distance L2 defined between the reading surface 8A and the upper edge 30T of the drive unit 30M. Further, as shown in FIG. 8B, the carriage 20 during the assembly to the base section 10 and the second elongated portion 52 are guided by the guide part 100. Thus, the guide part 100 ensures separation of the carriage 20 and the second elongated portion 52 from the drive unit 30M. As a result, both the carriage 20 during the assembly to the base section 10 and the wiring cable 50 can be reliably prevented from coming into contact with the drive unit 30M.

<Modifications>

While the present invention has been described in detail with reference to the embodiments thereof, it would be apparent to those skilled in the art that various changes and modifications may be made therein without departing from the spirit of the present invention.

For example, the guide part 100 may be provided separately from the base section 10 and assembled to the base section 10.

The present invention is available for an image reading apparatus and a multifunction apparatus.

What is claimed is:

1. An image reading apparatus comprising:
   a base section comprising a reading surface on which an original to be read is placeable, and a base wall confronting the reading surface, the reading surface extending in a first direction;
   a reading unit disposed above the base wall, and configured to read an image from an original placed on the reading surface;
   a movable body disposed above the base wall, and configured to support the reading unit, the movable body being configured to reciprocatingly move in the first direction between a first end position and a second end position;
   a drive unit disposed on the base wall and disposed on a first side where the first end position is located with respect to the first direction, the drive unit being configured to drive the movable body; and
   a cable having flexibility and disposed above the base wall, the cable having one end portion and another end portion, the one end portion being fixed to the base wall at a position between the first end position and the second end position, the another end portion being connected to the reading unit, the cable comprising:
   a first elongated portion extending along the base wall from the one end portion toward a second side where the second end position is located with respect to the first direction;
   a curved portion extending from the first elongated portion toward the second side and then curving toward the first side while approaching the reading surface, the curved portion having a part overlapping with the drive unit when viewed in the first direction; and
   a second elongated portion extending from the curved portion toward the first side to be connected to the another end portion.

2. The image reading apparatus as claimed in claim 1, wherein the first elongated portion comprises a folded portion at a position adjacent to the one end portion, the folded portion extending from the second side toward the first side and then folded back toward the second side.

3. The image reading apparatus as claimed in claim 2, wherein the base section comprises a positioning portion configured to fix a position of the one end portion relative to the base section.

4. The image reading apparatus as claimed in claim 3, wherein the base wall comprises a base portion, a protruding portion extending from the base portion toward the reading surface, and a planar portion extending from the protruding portion in the first direction and confronting the base portion, and
   wherein the positioning portion is a groove defined by the base portion, the protruding portion and the planar portion, the positioning portion being configured to accommodate the folded portion such that the protruding portion restricts the folded portion from moving toward the first side and such that the folded portion is interposed between the base portion and the planar portion.

5. The image reading apparatus as claimed in claim 1, wherein the base section comprises a guide portion protruding toward the reading surface from the base wall at a position between the one end portion and the drive unit,
   wherein the guide portion has an inclined surface that slopes upward from the second side toward the first side.

6. The image reading apparatus as claimed in claim 5, wherein the guide portion comprises:
   a plurality of plate-shaped portions extending in the first direction, the plurality of plate-shaped portions being juxtaposed with and spaced away from each other in a second direction parallel to the reading surface and perpendicular to the first direction; and
   a connecting portion extending in the second direction and connecting each of the plurality of plate-shaped portions.

7. The image reading apparatus as claimed in claim 5, wherein the guide portion and the reading surface define a first distance therebetween, the drive unit and the reading surface defining a second distance therebetween, the first distance being smaller than the second distance.

8. An image reading apparatus comprising:
   a reading portion comprising a reading surface on which an original to be read is placeable;
   a base section comprising a base wall confronting the reading surface;
   a reading unit disposed in the base section and configured to read an image from an original placed on the reading surface;
   a movable body disposed in the base section and configured to the reading unit, the movable body being configured to reciprocatingly move between a first stroke end and a second stroke end in a direction parallel to the reading surface;
   a drive unit disposed in the base section on a first stroke end side and configured to drive the movable body; and
   a cable having flexibility and disposed in the base section, the cable having one end portion and another end portion, the one end portion being fixed to the base wall at a position intermediate between the first stroke end and the second stroke end, the another end portion being connected to the reading unit, the cable comprising a curved portion provided between the one end portion and the another end portion, the curved portion protruding toward a second stroke end side, the curved portion having a part overlapping with the drive unit when viewed in the direction the movable body moves parallel to the reading surface.

9. The image reading apparatus as claimed in claim 1, wherein the base wall has a first region, and a second region having an upper surface positioned lower than an upper surface of the first region, the drive unit being disposed in the second region.

* * * * *